(12) United States Patent
Kellermann (10) Patent No.: US 8,844,672 B2
(45) Date of Patent: Sep. 30, 2014

(54) TWO-STROKE ENGINE COMPRISING A MUFFLER

(75) Inventor: Christian Kellermann, Grande (DE)

(73) Assignee: Makita Corporation, Aichi (JP)

( * ) Notice: Subject to any disclaimer, the term of this patent is extended or adjusted under 35 U.S.C. 154(b) by 0 days.

(21) Appl. No.: 13/985,651

(22) PCT Filed: Mar. 7, 2012

(86) PCT No.: PCT/EP2012/053901
§ 371 (c)(1),
(2), (4) Date: Aug. 15, 2013

(87) PCT Pub. No.: WO2012/120037
PCT Pub. Date: Sep. 13, 2012

(65) Prior Publication Data
US 2013/0319789 A1 Dec. 5, 2013

(30) Foreign Application Priority Data

Mar. 9, 2011 (DE) ..................... 20 2011 000 531 U
Mar. 9, 2011 (DE) ..................... 20 2011 000 535 U (51) Int. Cl.
*F02B 25/14* (2006.01)
*F02B 27/04* (2006.01)
*F01N 1/08* (2006.01)
*F01N 5/00* (2006.01)
*F02B 25/00* (2006.01)
*F02B 27/00* (2006.01)

(52) U.S. Cl.
CPC ............... *F01N 5/00* (2013.01); *F01N 2490/04* (2013.01); *F01N 2490/16* (2013.01); *F01N 1/089* (2013.01); *F02B 2700/037* (2013.01); *Y02T 10/146* (2013.01); *F01N 2590/06* (2013.01); *F02B 27/04* (2013.01)
USPC ..................... 181/249; 123/65 E; 123/65 VC (58) Field of Classification Search
USPC ....... 181/213, 249, 251, 253; 123/65 R, 65 E, 123/65 VC
See application file for complete search history.

(56) References Cited

U.S. PATENT DOCUMENTS 1,804,321 A 5/1931 Crowe
2,542,756 A 4/1947 Draminsky
(Continued)

FOREIGN PATENT DOCUMENTS

AT 404391 11/1998
AT 505406 1/2009
(Continued)

OTHER PUBLICATIONS

German Search Report in 20 2011 000 535.6 and English language translation, dated Jul. 29, 2011.

(Continued)

*Primary Examiner* — Edgardo San Martin
(74) *Attorney, Agent, or Firm* — Greenblum & Bernstein, P.L.C.

(57) ABSTRACT

The invention relates to a two-stroke engine for an engine-driven tool, including a muffler, especially for a manually operated engine-driven tool such as a maintenance device for gardens or green spaces, for a hand-held tool such as a chain saw, a hand-held circular saw or an angle grinder or for a small motorcycle, a boat engine and the like, wherein the flow channel between the muffler inlet and the first chamber is formed so as to promote flow such that the exhaust gas entering the muffler inlet mainly enters the first chamber due to its inertia and once the first chamber is full flows back again. The counterpressure of the exhaust gas is produced at a point in time in which the piston releases the outlet and the fuel-air mixture at least for its most part has entered the combustion chamber through the at least one transfer passage.

20 Claims, 5 Drawing Sheets

(56) References Cited

U.S. PATENT DOCUMENTS

| | | | |
|---|---|---|---|
| 4,848,279 A * | 7/1989 | Luo | 123/26 |
| 5,245,824 A | 9/1993 | Nouis | |
| 5,857,327 A | 1/1999 | Sato et al. | |
| 6,152,092 A * | 11/2000 | Andreasson et al. | 123/65 R |
| 6,497,204 B1 * | 12/2002 | Miyazaki et al. | 123/73 PP |
| 6,698,194 B2 | 3/2004 | Blair et al. | |
| 8,172,038 B2 | 5/2012 | Kellerman | |
| 8,540,051 B2 * | 9/2013 | Kellermann | 181/229 |
| 2002/0152747 A1 | 10/2002 | Blair | |
| 2004/0144081 A1 | 7/2004 | Lacy | |
| 2004/0255884 A1 | 12/2004 | Arnold | |
| 2006/0219203 A1 | 10/2006 | Kellerman | |
| 2009/0255519 A1 * | 10/2009 | Kellermann | 123/65 R |
| 2012/0241248 A1 * | 9/2012 | Schoenfeld et al. | 181/214 |

FOREIGN PATENT DOCUMENTS

| | | |
|---|---|---|
| AT | 507634 | 6/2010 |
| DE | 197 26 059 | 1/1998 |
| DE | 20 2005 005 328 | 9/2006 |
| DE | 600 26 339 | 10/2006 |
| DE | 20 2008 005 168 | 8/2009 |
| EP | 0070412 | 1/1983 |
| EP | 0446813 | 9/1991 |
| EP | 0554875 | 8/1993 |
| JP | 60-142009 | 7/1985 |
| WO | 85/04689 | 10/1985 |
| WO | 2006/080044 | 8/2006 |

OTHER PUBLICATIONS

German Search Report in 20 2011 000 531.3 and English language translation, dated Oct. 19, 2011.

International Search Report and English language translation, dated Apr. 1, 2013.

Woschni: Gas exchange two-stroke engine, lecture Notes; 2nd edition, Munich, Technical University Munich 1988, pp. 64-65.-ISBN 0-0, cited in German Search Report dated Jul. 29, 2011.

* cited by examiner

TWO-STROKE ENGINE COMPRISING A MUFFLER

The present invention relates to a two-stroke engine with a muffler for an engine-driven tool, in particular for a manually operated engine-driven tool, such as a maintenance device for gardens and green spaces, for a hand-held tool such as a chainsaw, a hand-held circular saw or an angle grinder or for a small motorcycle, a boat engine and the like, wherein the muffler comprises a muffler inlet which is followed by a flow channel, so that the flow channel by means of the muffler inlet can be attached to an outlet of a combustion chamber of the two-stroke engine, and wherein at least one overflow channel opens into the combustion chamber, via which the fuel-air mixture enters the combustion chamber when a piston moveably limiting the combustion space is located in the region of the bottom dead centre, wherein the flow channel at the channel end located opposite the muffler inlet opens into a first chamber, wherein furthermore a second chamber is provided, into which exhaust gas flows through a main outlet branched off from the flow channel and out of which the exhaust gas flows through an outlet, wherein the flow channel between the muffler inlet and the first chamber is flow-favorably formed such that the exhaust gas flowing into the muffler inlet because of its mass inertia predominantly flows into the first chamber and following a charging of the first chamber flows back again and because of this a counterpressure is formed in the or in the direction of the combustion space according to the preamble of claim 1. Furthermore, the invention is directed at an operating method for operating the two-stroke engine.

PRIOR ART

From DE 20 2008 005 168 U1 a generic two-stroke engine with a muffler of the type of interest here is known. The two-stroke engine is represented in a simplified form and arranged on the outlet of the two-stroke engine, so that in the combustion space of the two-stroke engine combusted fuel-air mixture can enter the muffler. Here, the exhaust gas enters a flow channel of the muffler via which the muffler is attached to the cylinder of the two-stroke engine by means of the muffler inlet. The muffler inlet is followed by the flow channel as a pipeline of straight design, which opens into a first chamber via a channel end. Between the muffler inlet and the channel end a main outlet is arranged on the flow channel, an exhaust gas can enter from the flow channel into a second chamber through the main outlet and via an outlet leave the second chamber and get into the open.

The flow channel is embodied straight, so that the exhaust gas shooting into the flow channel via the muffler inlet favorably flows initially at least predominantly into the first chamber and forms an overpressure in the first chamber. Through its overpressure a large part of the exhaust gas flows back in the direction of the muffler inlet or even into the combustion space and forms a gas barrier through which it is prevented that fuel-air mixture recharge into the combustion space of the cylinder through the overflow channel enters the muffler in the uncombusted state or fuel-air mixture that has already entered the muffler can be transported back into the combustion chamber through the exhaust gas flowing backwards. The geometrical configuration of the flow channel and the volume of the first chamber are defined such that a flow behavior of the exhaust gas in the flow channel and the first chamber is created which corresponds to the stroke movement of the piston and the opening of the outlet of the combustion space in the region of the bottom dead centre of the piston. Thus, better emission values are achieved, the efficiency of the two-stroke engine in particular can be increased through a reduction of the emission of uncombusted fuel-air mixture compared with conventional mufflers.

The muffler which is of interest here makes possible a flowing back of the exhaust gas in the direction of the outlet of the combustion space. Here, the objective is pursued in principle that the exhaust gas from the first chamber forms the counterpressure in the direction of the muffler inlet at a time during which the outlet of the combustion chamber is opened, namely when the piston passes through the region of the bottom dead centre. Only then is it possible that fuel-air mixture that has already entered the flow channel can be pushed back into the combustion space of the two-stroke engine so that following the emptying of the combustion space through the outflowing of the exhaust gas into the muffler, a pressure increase is briefly generated in the combustion space again, which is generated through the exhaust gas flowing back into the combustion space.

The fuel-air mixture initially enters the crankcase of the two-stroke engine via an inlet and in the crankcase the fuel-air mixture is pre-compressed through the downward movement of the piston. Through the downward-movement of the piston, the overflow channel, which opens into the combustion space, is exposed and the fuel-air mixture flows through the overflow channel from the crankcase into the combustion space.

In order to additionally prevent that the fuel-air mixture flowing into the combustion space through the overflow channel enters the muffler through the outlet of the combustion space in the uncombusted state, geometrical configurations are frequently provided on the piston of the two-stroke engine in order to direct the fuel-air mixture away from the region of the outlet, when said mixture flows into the combustion chamber through the overflow channel. However, the entering of uncombusted fuel-air mixture in the muffler cannot be completely prevented and even by forming a counterpressure of an exhaust gas flowing back out of a muffler in the direction of the combustion space or into the combustion space, escaping of uncombusted fuel-air mixture from the combustion space through the outlet cannot be completely prevented.

Furthermore, a flow behavior of the fuel-air mixture through the overflow channel into the combustion space can occur as a function of the operating state of the two-stroke engine which lets a quantity of fuel-air mixture that is too large enter the combustion space of the two-stroke engine. The quantity of the fuel-air mixture which enters the combustion space through the overflow channel is determined in addition to the pressure of the fuel-air mixture in the crankcase of the two-stroke engine and the geometrical design of the flow channel also through the timing through which the overflow channel is opened and closed through the movement of the piston. The overflow channel can be opened over a crank angle of up to 100° crank angle, and the overflow channel in the bottom dead centre of the piston is opened to the maximum. Here, the overflow channel can open into the combustion space with a relatively large cross-sectional area which in particular favors an advantageous flow behavior of the fuel-air mixture into the combustion space. However, a large cross section of the overflow channel and a large cross section of the mouth of the overflow channel into the combustion space can create the disadvantage of a quantity of fuel-air mixture that is too large being introduced into the combustion space.

In the known muffler the flow channel is embodied straight so that exhaust gas shooting into the flow channel via the muffler inlet favorably initially flows at least predominantly into the first chamber and forms an overpressure in the first chamber. Through this overpressure, a large part of the exhaust gas flows back in the direction of the muffler inlet and forms a gas barrier through which it is prevented that fuel-air mixture recharged into the combustion space of the cylinder enters the muffler in the uncombusted state or fuel-air mixture that has already entered the muffler can be transported back into the combustion space through the exhaust gas flowing back. The geometrical configuration of the flow channel and the volume of the first chamber are determined in such a manner that a flow behavior of the exhaust gas in the flow channel and the first chamber is created, which corresponds to the stroke movement of the piston and the opening of the outlet of the combustion space on passing through the region of the bottom dead centre of the piston. By means of this, better emission values are achieved, in particular, the efficiency of the two-stroke engine can be increased through a reduction of the emission of uncombusted fuel compared with conventional mufflers.

In mufflers, which make possible a flowing back of the exhaust gas in the direction of the outlet of the combustion space, the objective is being pursued in principle that the exhaust gas from the first chamber forms a counterpressure in the direction of the muffler inlet at the right time during which the outlet of the combustion space in the region of the bottom dead centre of the piston is still opened. In addition the objective is pursued that the exhaust gas flowing back forms a pressure in the correct amount so that the exhaust gas does not return into the combustion space but the pressure should be determined such that the escaping of uncombusted fuel-air mixture from the combustion space into the muffler is effectively avoided. Here it is known that this optimization can be achieved with the length of the flow channel and of the first chamber, however also through the volume of the first chamber.

Furthermore, a muffler has the objective of muffling the noise which is created when the exhaust gas exits the combustion space as effectively as possible. Particularly effective muffling is achieved when on the outlet of the muffler the exhaust gas has the least possible pressure fluctuations. This optimization is accompanied by the desire of a certain sound pattern of the engine-driven tool, but the objective of being able to use certain materials for constructing mufflers is also pursued. A large total volume of the muffler influences the two-stroke engine rather at lower rotational speeds, a smaller total volume of the muffler influences the two-stroke engine rather at higher rotational speeds. Here, the muffler noise is influenced through the pressure oscillations prevailing in the muffler.

DESCRIPTION OF THE INVENTION

Object, Solution, Advantages

It is therefore the object of the present invention to further develop a two-stroke engine with a muffler of the type described above so that the flow behavior of the fuel-air mixture into the combustion space of the two-stroke engine is improved, it is the object of the present invention in particular to prevent that fuel-air mixture enters the muffler in the uncombusted state and in particular to control the quantity of fuel-air mixture which enters the combustion space via the overflow channel. The object of the present invention is to influence the pressure fluctuations of the exhaust gas on exiting the muffler through a corresponding adaptation of the volumes involved on the muffler. The object of the present invention, in particular, is to achieve a preferably major noise reduction of the operation of the two-stroke engine.

Starting out from a two-stroke engine with a muffler of the type described above, this object is solved according to the preamble of claim 1 in conjunction with the characterizing features. Advantageous further developments of the invention are stated in the dependent claims.

Starting out from a muffler for a two-stroke engine of an engine-driven tool this object is solved according to the preamble of claim 11 in conjunction with the characterizing features. Advantageous further developments of the invention are stated in the dependent claims.

The invention includes the technical teaching that forming the counterpressure of the exhaust gas takes place in a time range in which the outlet is exposed by the piston and the fuel-air mixture has at least predominantly entered the combustion space through the at least one overflow channel.

The invention in this case is based on the idea that the outflow behavior of the fuel-air mixture from the overflow channels into the combustion space is influenced through the counterpressure of the exhaust gas, which exhausts gas flows back from the muffler in the direction of the combustion space, i.e. also partially into the combustion space.

In particular, the geometrical design of the at least one overflow channel can be such that forming the counterpressure of the exhaust gas takes place in the required time range in which the overflow channel or channels to the combustion space is/are not yet exposed by the piston. The geometrical design of the overflow channel or channels determines the timing for their opening, and the overflow channel forms a kind of slide valve with the piston, and the overflow channel is exposed when the piston passes through the region of the bottom dead centre. In particular the cross-sectional height of the overflow window or windows, with which the overflow channel opens into the combustion space and which corresponds to the piston stroke direction, forms the corresponding size for determining the timing. A large cross-sectional height of the overflow window causes a long opening time of the overflow window and according to the invention, the overflow window of the overflow channel is designed so that the overflow channel is at least partially still or already opened when the counterpressure of the exhaust gas from the muffler forms in front of or even in the combustion space.

Additionally or alternatively, at least the flow channel and the first chamber can be designed in such a manner that forming the counterpressure through the exhaust gas takes place in the required time range in which the overflow channel to the combustion space is exposed by the piston. When the outlet of the combustion space in the direction of the muffler is opened through the downward movement of the piston, the exhaust gas enters the flow channel and at least predominantly the first chamber and following the charging of the first chamber flows back through the flow channel to the outlet of the combustion space or even into the combustion space. This produces a flow duration of the exhaust gas from the entry into the muffler to the return flow in front of the outlet or into the combustion space of the two-stroke engine and the flow duration can correspond with the timing of the overflow channel such that the overflow channel is still opened when the counterpressure has reached the combustion space of the two-stroke engine. Here, the flow duration is influenced in particular through the length, however also through the cross-sectional area of the flow channel, furthermore the flow duration is influenced through the volume of the first chamber, so that at least the flow channel and/or the first chamber can be designed so that the necessary flow duration is achieved. For example, the ratio of the volume of the first chamber to the stroke volume of the two-stroke engine can be ¼ to 2. Furthermore, the volume of the first chamber in the total volume of the muffler, formed through the absolute volume of the second chamber, can be 1/40 to ½. With yet a further advantage, the ratio of the volume of the second chamber to the stroke volume can be 4 to 10. Furthermore, the ratio of the numerical value of the total length from the flow channel and the depth of the first chamber in centimeters to the numerical value of the stroke volume of the two-stroke engine in cubic centimeters can be 0.15 to 0.35, in particular less than 0.15 to 0.35.

According to an advantageous measure of the invention, the counterpressure of the exhaust gas can be determined with respect to the time and/or its height such that the outflow behavior, in particular the quantity of the fuel-air mixture entering the combustion space through the overflow channel can be influenced, in particular reduced. As a function of the geometrical configuration of the overflow window, the fuel-air mixture can shoot into the combustion space in a preferred direction while it has to be avoided that this preferred direction faces in the direction of the outlet of the combustion space into the muffler. According to the invention and in addition to geometrical moldings on the piston surface limiting the combustion space and for the advantageous forming of the overflow channel and of the overflow window in the inlet of the overflow channel into the combustion space the effect can be utilized that through the counterpressure of the exhaust gas the outflow behavior of the fuel-air mixture is positively influenced, in particular that the fuel-air mixture does not reach in the direction of the outlet. Here, the outlet can be arranged in a position on the cylinder located opposite the overflow channel.

It has been possible, furthermore, to observe that through the counterpressure of the exhaust gas out of the muffler, the quantity of fuel-air mixture shooting into the combustion space can be influenced, in particular reduced. Once the exhaust gas has escaped from the combustion space through the outlet into the muffler, the pressure in the combustion space can drop after the escape of the exhaust gas and after the flow duration of the exhaust flow in the flow channel and the first chamber back into the combustion space, increase again as a result of which the quantity of fuel-air mixture can be reduced, which through the overflow channel reaches the combustion space from the crankcase since the pressure of the exhaust gas forms a counterpressure against the fuel-air mixture. Thus, the outflow behavior of the fuel-air mixture can be positively influenced through the counterpressure of the exhaust gas and furthermore the quantity of fuel-air mixture which reaches the combustion space through the overflow channel can be influenced. This produces asymmetrical timing of the opening both of the outlet as well as of the overflow channel into the combustion space and the flow cross section of the overflow channel and of the overflow window of the overflow channel into the combustion space can be dimensioned larger, wherein despite of the larger dimensioning the quantity of fuel-air mixture entering the combustion space can be reduced through the counterpressure of the exhaust gas.

The outlet of the combustion space can open at approximately 110° crank angle, wherein the flow channel and/or the first chamber can be designed such that in the first chamber a maximum pressure at 140° to 160° crank angle is obtained. At approximately 160° crank angle, the exhaust pressure in the combustion space initially reaches a minimum so that subsequently an intermediate maximum pressure is again formed in the combustion space through the counterpressure of the exhaust gas, when the piston is located in the bottom dead centre, which is reached at 180° crank angle. Consequently, the maximum pressure in the first chamber is preferably reached approximately at 30° to 40° crank angle before the bottom dead centre of the piston of the two-stroke engine and through the return flow of the exhaust gas this forms a counterpressure in the combustion space with an intermediate maximum pressure at 180° crank angle.

The object of the present invention is solved furthermore through an operating method for operating a two-stroke engine of an engine-driven tool with a muffler, in particular for a manually operated engine-driven tool such as a maintenance device for gardens or green spaces, for a hand-held tool such as a chainsaw, a hand-held circular saw or an angle grinder or for a small motorcycle, a boat engine and the like, wherein the muffler comprises a muffler inlet which is followed by a flow channel, so that the flow channel is attached to an outlet of the combustion space of the two-stroke engine by means of the muffler inlet, and wherein at least one overflow channel opens into the combustion space, via which the fuel-air mixture enters the combustion space when a piston moveably limiting the combustion space is located in the region of the bottom dead centre, wherein the flow channel opens into a first chamber at the channel end located opposite the muffler inlet, wherein furthermore a second chamber is provided, into which the exhaust gas flows through a main outlet branched off the flow channel and from which the exhaust gas flows out through an outlet, wherein the flow channel between the muffler inlet and the first chamber is flow-favorably molded such that the exhaust gas flowing into the muffler inlet predominantly flows into the first chamber because of its mass inertia and following a charging of the first chamber flows back again, and because of this a counterpressure is formed in the direction of the combustion space, wherein via the stroke movement of the piston at least the steps of the opening of the outlet of the combustion space is provided through a further downward movement of the piston, the forming of the counterpressure of the exhaust gas in the direction of the combustion space, the closing of the overflow channel through a downward movement of the piston and the closing of the outlet through a further upward movement of the piston.

In particular, the counterpressure of the exhaust gas can be formed in a time range, in which the piston passes through the bottom dead centre, in particular it can be provided that through the counterpressure of the exhaust gas an intermediate maximum pressure is formed in the combustion space when the piston is located in the bottom dead centre. It can be provided, furthermore, that through the counterpressure of the exhaust gas the outflow behavior of the fuel-air mixture from the overflow channel into the combustion space is influenced, in particular that the quantity of the fuel-air mixture entering the combustion space from the overflow channel is reduced through the counterpressure of the exhaust gas.

The invention furthermore includes the technical teaching that the ratio of the volume of the first chamber to the total volume of the muffler is 1/40 to ½.

Here, the invention starts out from the idea of optimizing the volumes involved on the muffler such that a preferably favorable noise reduction is achieved during the operation of the engine-driven tool. Here it has been shown that with a volume of the first chamber in the ratio to the total volume of the muffler of 1/40 to ½ the pressure oscillations at the outlet of the muffler decrease particularly severely, so that the noise during the operation of the engine-driven tool can be designed quieter.

In particular, the ratio of the volume of the first chamber to the total volume of the muffler can be 1/20 to 1/8, as a result of which good results for the noise reduction were achieved. In particular, the ratio of the volume of the first chamber to the total volume of the muffler can be $1/16$ to $1/10$, wherein best results were achieved when the ratio of the volume of the first chamber to the total volume of the muffler is approximately $1/12$.

The total volume of the muffler can be formed from the volumes of the first chamber, the second chamber and of the flow channel. The first chamber can be enclosed by the second chamber, furthermore the second chamber can be designed such that said chamber likewise encloses at least a part of the flow channel, wherein the first chamber can also be arranged outside the second chamber. For this reason, the total volume of the muffler can be stated approximately through the volume of the second chamber, and the outlet, on which the pressure oscillations are to be minimized, in order to achieve as low as possible a noise level when operating the two-stroke engine, relates to the outlet through which the exhaust gas leaves the second chamber into the open.

The ratio of the volume of the flow channel to the total volume of the muffler can be $1/50$ to $1/10$. In addition, the volume of the main outlet can also be added to the volume of the flow channel. In addition, the first chamber can have an auxiliary outlet, through which the exhaust gas from the first chamber can directly overflow into the second chamber without again at least partially flowing through the flow channel. Here, the volume of the auxiliary outlet can be assigned to the first chamber, however preferably to the volume of the second chamber and thus to the total volume of the muffler.

The ratios of the volumes of the first chamber to the total volume of the muffler, however also of the volume of the flow channel to the total volume of the muffler primarily leads to lower pressure fluctuations on the main outlet, which is arranged on the flow channel, and through which the exhaust gas can enter the second chamber from the flow channel. A reduction of the total noise level of the muffler however is achieved when the pressure fluctuations of the exhaust gas at the outlet from the second chamber are minimized, through which the exhaust gas can reach into the open.

Through the volume ratio of the first chamber to the total volume of the muffler according to the invention, which is substantially formed through the volume of the second chamber, however, a reduction of the pressure fluctuations on the main outlet is initially achieved.

Here, the effect is achieved that the frequency of the pressure fluctuations, with which the exhaust gas reaches the second chamber through the main outlet, does not correspond to the resonance frequency of the second chamber. Here it is important that the excitation frequency of the second chamber has a preferably large distance from the pulsation frequency of the pressure fluctuations of the exhaust gas, with which the exhaust gas flows into the second chamber through the main outlet. A particularly effective reduction of the total noise level of the muffler can only be achieved through this.

In the result the objective is pursued that in the interior of the muffler, formed through the interaction from the first chamber, the flow channel and the combustion space a flow principle is utilized in order to create the pulsating pressure barrier at the outlet of the combustion space and in order to optimize the emission values through this. For the outer part of the muffler, substantially formed through the second chamber, which encloses the first chamber and the substantial part of the flow channel, the objective is pursued to preferably have no resonance develop, so that the frequency of the pressure fluctuations, with which the exhaust gas enters the second chamber through the main outlet, preferably does not coincide with the excitation frequency of the second chamber. Consequently, a particularly favorable acoustic muffling result of the muffler is obtained, so that on the one hand very favorable emission results are achieved while a very favorable reduction of the operating noise of the engine-operated tool can be achieved on the other hand.

According to a further measure of the present invention, the two-stroke engine can have a stroke volume and the ratio of the volume of the first chamber to the stroke volume is $1/4$ to 2. With this ratio between the stroke volume of the two-stroke engine, which is preferentially embodied as a one-cylinder engine, and the volume of the first chamber, the exhaust flow principle for forming an exhaust gas counterpressure can be particularly effectively implemented in order to optimize the emission values, however also the consumption values of the two-stroke engine.

According to a further advantageous measure, the ratio of the volume of the second chamber to the stroke volume can be 4 to 10. Through this ratio, a particularly favorable noise minimization during the operation of the two-stroke engine is achieved.

The muffler can be preferentially produced from a stainless steel, for example with the material number 1.4301, and the modulus of elasticity of the material can preferentially be 200,000 $N/mm^2$.

BRIEF DESCRIPTION OF THE DRAWINGS

Further measures improving the invention are shown in more detail in the following jointly with the description of a preferred exemplary embodiment of the invention by means of the Figures. It shows.

PREFERRED EMBODIMENT OF THE INVENTION

Figure 1:
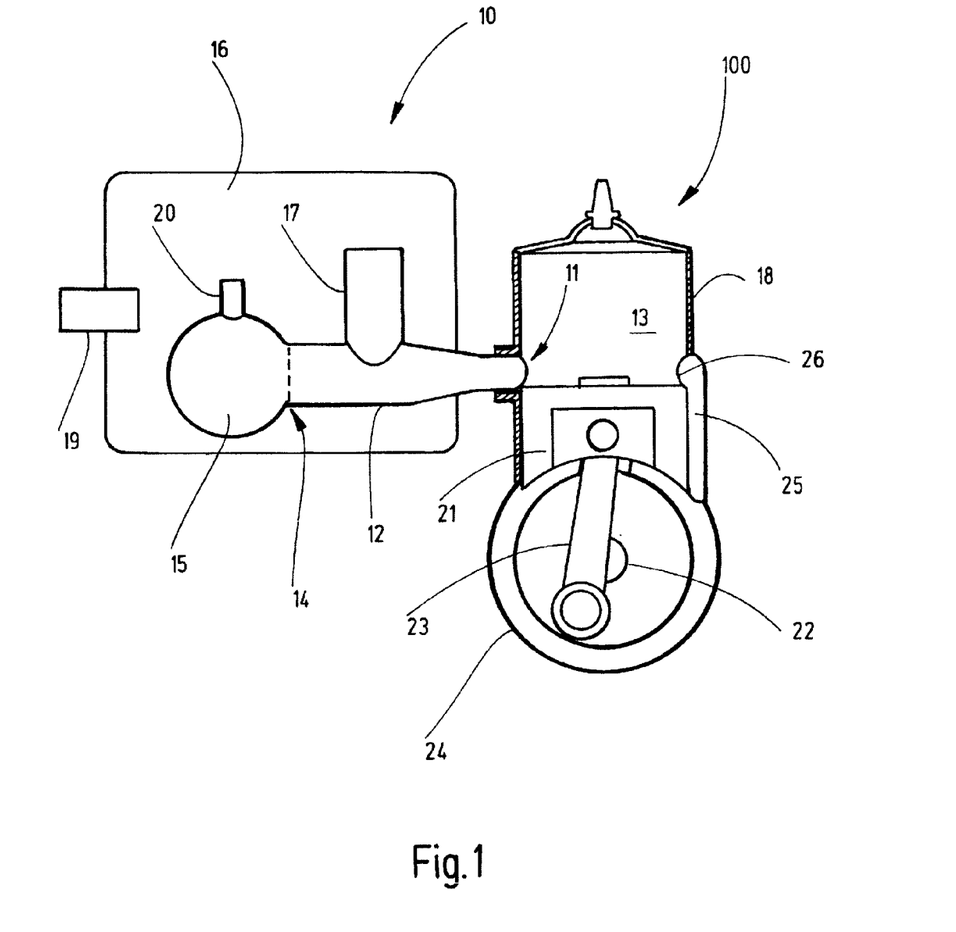
FIG. 1 a schematic representation of an exemplary embodiment of a two-stroke engine with a muffler, FIG. 2 a diagram of the pressures over the crank angle of the two-stroke engine in the first chamber and in the combustion space, FIG. 3 a schematic view of a muffler of the type of interest here arranged on a two-stroke engine, FIG. 4 a diagram of the pressure over the crank angle of the two-stroke engine with different pressure curves at a rotational speed of 7,000 rpm and FIG. 5 a diagram of the pressure over the crank angle of the two-stroke engine with different pressure curves at a rotational speed of 10,000 rpm.

FIG. 1 shows a two-stroke engine 100 in a schematic, cross-sectioned view, and on the two-stroke engine 100, a muffler 10 is attached. The two-stroke engine 100 comprises a cylinder 18, in which a combustion space 13 is formed. The combustion space 13 is moveably limited by a piston 21, which via a connecting rod 23 is connected to a crankshaft 22 for forming a crank drive, and the crankshaft 22 is mounted in a crankcase 24. In the wall of the cylinder 18, an outlet is arranged, to which the muffler 10 is flanged via a muffler inlet 11 in a manner not shown in any more detail. When the piston 21 is located near the bottom dead centre in the shown position, the piston 21 exposes the outlet of the combustion space 13 in this region, and exhaust gas can reach the muffler 10 from the combustion space 13 through the muffler inlet 11. The muffler inlet 11 is followed by a flow channel 12, which with a channel end located opposite the muffler inlet 11 opens into a first chamber 15. Furthermore, the muffler 10 comprises a second chamber 16, which is exemplarily designed larger than the first chamber 15 and which encloses preferentially completely the first chamber 15 and likewise a part of the flow channel 12.

The exhaust gas entering the muffler inlet 11 can initially reach the first chamber 15 at least for the greatest part, wherein on the flow channel 12 a main outlet 17 is arranged, and the exhaust gas can reach the second chamber 16 from the flow channel 12 through the main outlet 17. Furthermore, the first chamber 15 has an auxiliary outlet 20, so that exhaust gas can also flow out of the first chamber 15 directly into the second chamber 16. The exhaust gas can leave the muffler 10 through an outlet 19, which is introduced in the wall of the second chamber 16 and reach the open.

The flow channel 12 extends in a straight design between the first chamber 15 and the muffler inlet 11, and is thus flow-favorably molded such that the exhaust gas flowing into the muffler inlet 11 because of its mass inertia predominantly flows into the first chamber 15, generating an overpressure therein. Following a charging of the first chamber 15, the exhaust gas can again flow back in the direction of the muffler inlet 11 and because of this form a counterpressure against the combustion space 13. It is thus avoided that fuel-air mixture reaches the muffler 10 in the uncombusted state or fuel-air mixture which has already entered the muffler 10 is pushed back into the combustion space 13. Only after the return flow of the exhaust gas against the outlet of the combustion space 13 can the exhaust gas leave the flow channel 12 or the first chamber 15 through a main outlet 17 and enter the second chamber 16, reaching the open through the outlet 19.

On the two-stroke engine 100, an overflow channel 25 is shown, which forms a flow connection between the crankcase 24 and the combustion space 13. In a manner which is not shown in any more detail, the fuel-air mixture is initially sucked into the crankcase 24 through an inlet when the piston 21 performs an upward movement, enlarging the volume of the crankcase 24. The sucked-in fuel-air mixture is subsequently compressed in the crankcase through a downward movement of the piston 21, so that the fuel-air mixture is over-pressurized. When the piston in its stroke movement travels towards the bottom dead centre the piston 21 exposes an overflow window 26 in the wall of the cylinder 18 and the overflow window 26 forms the inlet of the overflow channel 25 into the combustion space 13. Consequently the fuel-air mixture can flow through the overflow channel 25 because of the overpressure in the crankcase 24 and enter the combustion space 13 through the overflow window 26. During the upward movement of the piston 21, both the overflow channels 25 as well as the outlet of the combustion space 13 into the muffler inlet 11 are closed again and the fuel-air mixture that has entered the combustion space 13 can be compressed and ignited.

According to the representation, the overflow channel 25 in the overflow window 26 opens into the combustion space 13 in a position when the combustion space 13 also has a flow connection to the muffler inlet 11. Through this arrangement according to the invention, the exhaust gas flowing back through the flow channel 12 out of the first chamber 15 in the direction of the combustion space 13 can form a counterpressure or even flow into the combustion space 13 and form an overpressure therein, and an interactive action between the exhaust gas flowing back and the fuel-air mixture flowing into the combustion space 13 through the overflow channel 25 can take place. In particular, the exhaust gas flowing back can form a temporary overpressure in the combustion space 13 even during the opening time of the outlet and through the overpressure, the quantity of fuel-air mixture and the outflow behavior of the fuel-air mixture which flows through the overflow channel 25 into the combustion space 13 can be influenced. Consequently the sourced gas flowing back in the combustion space 13 can form a temporary pressure shock through which the fuel-air mixture flowing into the combustion space 13 can be influenced.

Figure 2:
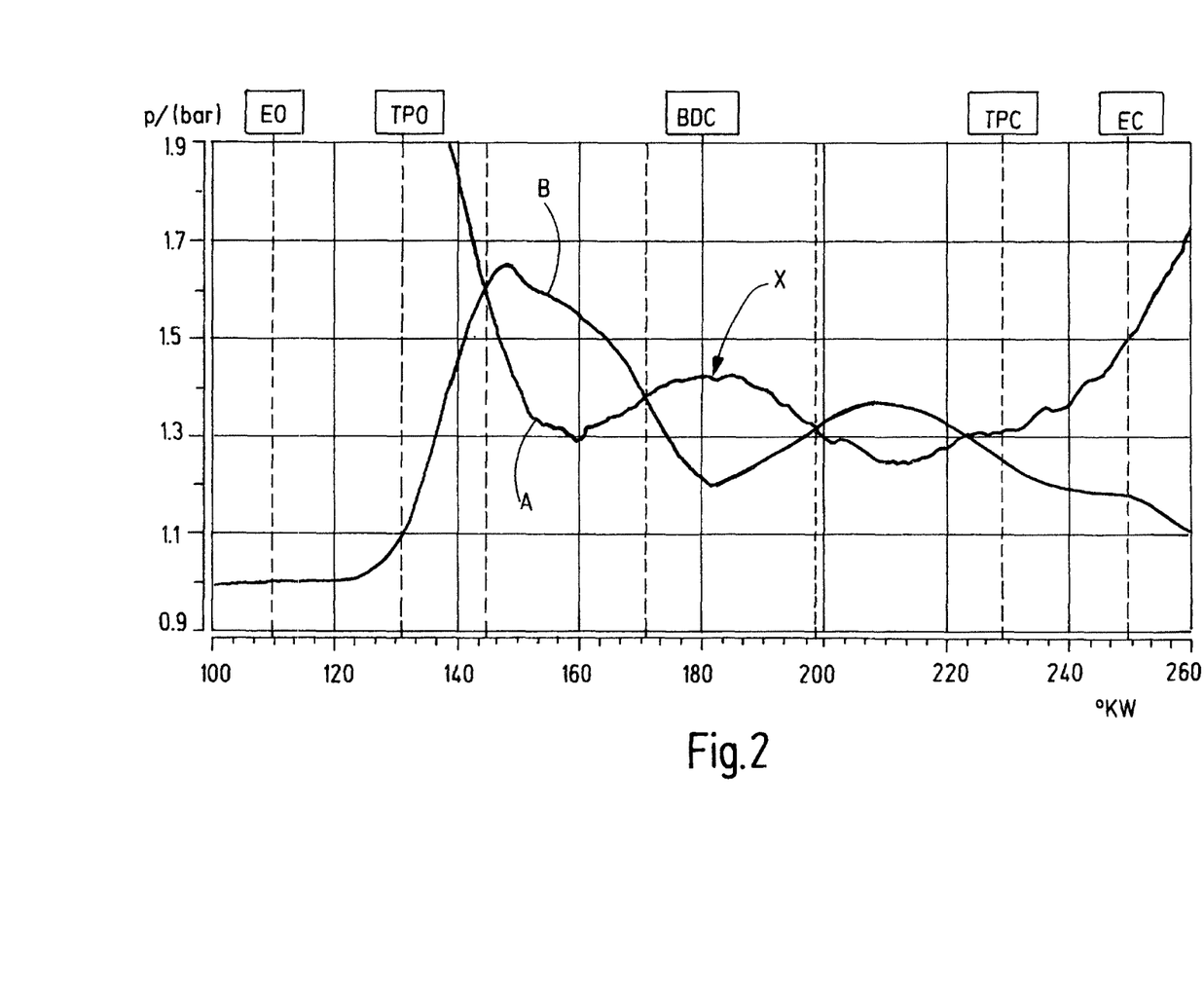

FIG. 2 shows a pressure in a diagram, which is plotted over a crank angle ° KW in degrees. The diagram shows two pressure curves A and B, and the pressure curve A reflects the pressure curve in the combustion space 13 and the pressure curve B reflects the pressure curve in the first chamber 15. At a crank angle of approximately 110°, the outlet of the combustion space 13 opens, characterized by EO, at approximately 130° the overflow channel 25 into the combustion space 13 opens, characterized by TPO, wherein the closing of the overflow channel 25 is characterized by TPC, and occurs at 230°. The outlet of the combustion space 13 is closed at approximately 250°, characterized by EC. It thus becomes clear that the outlet window in the cylinder 18 has a greater extension in the piston stroke direction than the overflow channel 25. However, both the outlets as well as the overflow channel 25 are opened between 130° crank angle and 230° crank angle.

The pressure curve A in the combustion space 13 shows that following the opening of the outlet of the combustion space 13 the pressure in the combustion space 13 drops until the pressure A reaches a value of approximately 1.3 bar. Here, the exhaust gas flows out of the combustion space 13 into the muffler 10 so that the pressure curve B measured in the first chamber 15 shows an increase. Thus, the exhaust gas flows out of the combustion space 13 into the first chamber 15 and upon a drop of the pressure curve A an increase of the pressure curve B is recorded. The maximum pressure in the first chamber 15 is reached at approximately 145° crank angle and flows through the flow channel 12 back into the combustion space 13. In the region of the bottom dead centre BDC the pressure in the first chamber 15 therefore reaches a temporary minimum and the pressure in the combustion space 13 shows an increase to an intermediate maximum pressure, characterized by X. The intermediate maximum pressure X is approximately reached in the bottom dead centre BDC and through the intermediate pressure in the combustion space 13 the fuel-air mixture can be influenced, which fuel-air mixture likewise flows into the combustion space 13 through the overflow channel 25 at the same time. The pressure curve B in the first chamber 15 shows a further intermediate maximum pressure in the following, since a part of the exhaust gas again flows back in the direction of the first chamber 15 before the exhaust gas leaves the flow channel 12 or the first chamber 15 through the main outlet 17.

The pressure curve A in the combustion space 13 explains an exhaust gas return flow that takes place at a time between the opening TPO of the overflow channel 25 and the closing TPC of the overflow channel 25.

Figure 3:
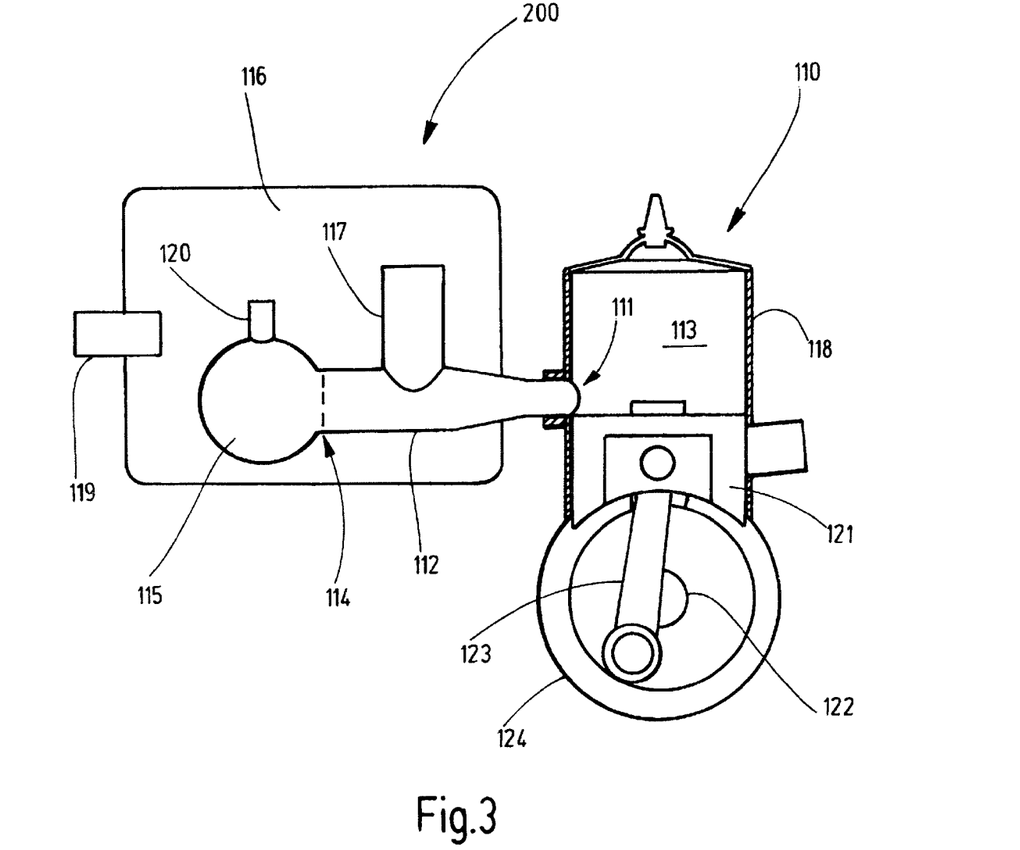

FIG. 3 shows a two-stroke engine 110 in a schematic, cross-sectioned view and a muffler 200 is attached to the two-stroke engine 110. The two-stroke engine 110 comprises a cylinder 118, in which a combustion space 113 is formed. The combustion space 113 is moveably limited by a piston 121, which via a connecting rod 123 is connected to a crankshaft 122 for forming a crank drive and the crankshaft 122 is mounted in a crankcase 124. In the wall of the cylinder 118 an outlet is arranged, to which the muffler 200 is flanged via a muffler inlet 111 in a manner which is not shown in any more detail. When the piston 122 is located in the shown position of the bottom dead centre, the piston 121 exposes the outlet of the combustion space 113 and exhaust gas can enter the muffler 200 from the combustion space 113 through the muffler inlet 111. The muffler inlet 111 is followed by a flow channel 112, which with a channel end 114 located opposite the muffler inlet 111 opens into a first chamber 115. The muffler 110 furthermore comprises a second chamber 116 which is designed larger than the first chamber 115 and which encloses the first chamber 115 completely and likewise a part of the flow channel 112.

The exhaust gas entering the muffler inlet 111 can initially at least for the greater part enter the first chamber 115, wherein on the flow channel 112 a main outlet 117 is arranged and the exhaust gas can enter the second chamber 116 out of the flow channel 112 through the main outlet 117. Furthermore, the first chamber 115 comprises an auxiliary outlet 120 so that exhaust gas can also directly flow into the second chamber 116 out of the first chamber 115. The exhaust gas can leave the muffler 200 through an outlet 119, which is introduced in the wall of the second chamber 116.

The flow channel 112 extends in a straight design between the first chamber 115 and the muffler inlet 111 and is thus molded flow-favorably in such a manner that the exhaust gas flowing into the muffler inlet 111 because of its mass inertia predominantly flows into the first chamber 115, generating an overpressure therein. Following a charging of the first chamber 115, the exhaust gas can again flow back in the direction of the muffler inlet 111 and because of this form a counter-pressure against the combustion space 113. In this way it is avoided that fuel-air mixture reaches the muffler 200 in the uncombusted state or fuel-air mixture which has already entered the muffler 200 is pushed back into the combustion space 113. Only after the return flow of the exhaust gas against the outlet of the combustion space 113 can the exhaust gas leave the flow channel 112 or the first chamber 115 through a main outlet 117 and enter the second chamber 116. The exhaust gas finally leaves the muffler 200 through an outlet 119, which is introduced in the second chamber 116 and the exhaust gas can reach the open through the outlet 119.

The representation shows the first chamber 115 with dimensions which are significantly smaller than the dimensions of the second chamber 116, and the second chamber 116 exemplarily encloses the first chamber 115 as well as a part of the flow channel 112. Here, the ratio of the volume of the first chamber 115 to the total volume of the muffler is 1/40 to 1/2, and the total volume of the muffler 200 is formed through the absolute volume of the second chamber 116. Because of this, a substantial reduction of the operating noise of the two-stroke engine 110 is achieved, which is substantially determined through the pressure curve and in particular through the pressure fluctuations on the main outlet 117 or on the outlet 119 of the muffler 200.

Figure 4:
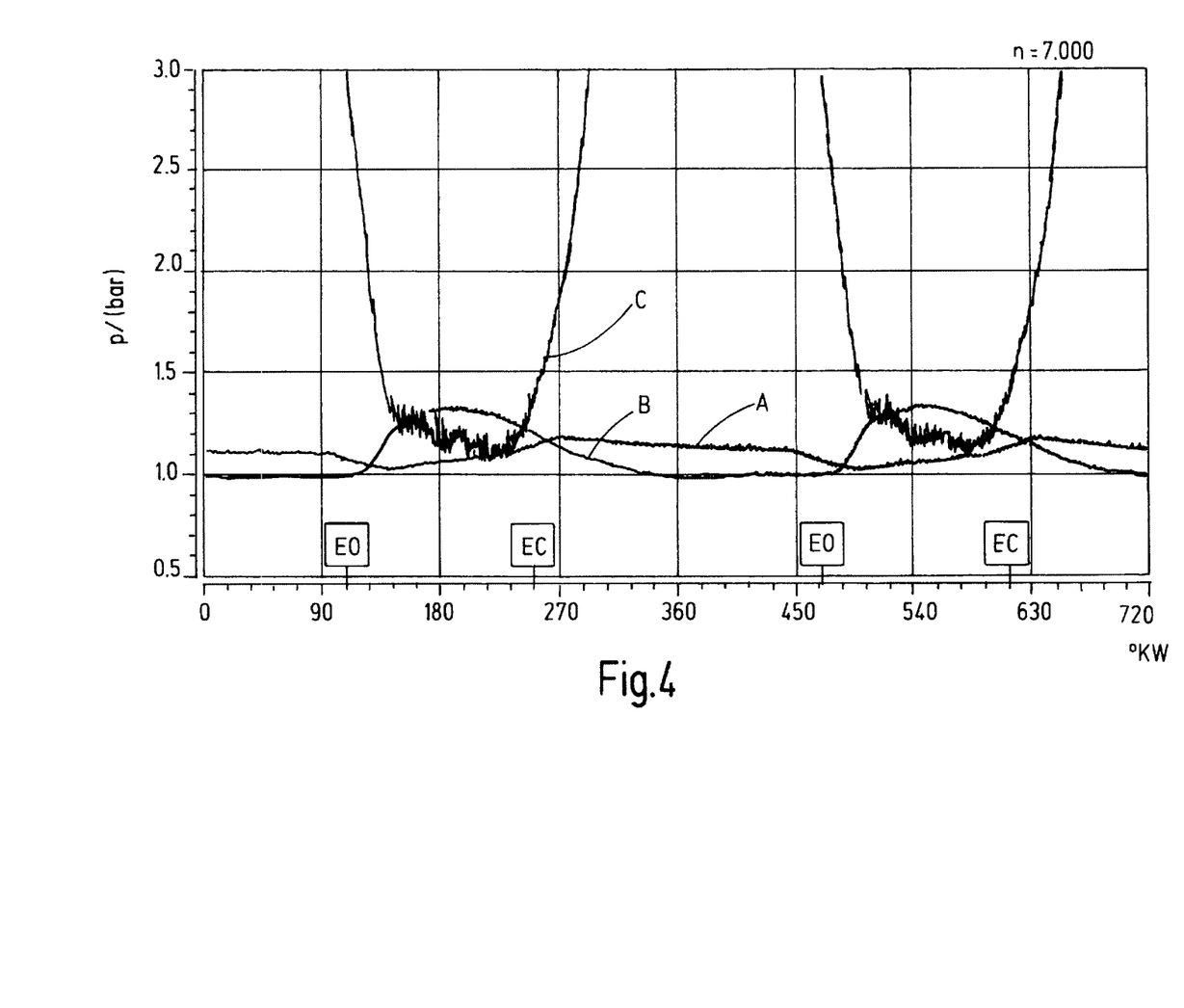
Figure 5:
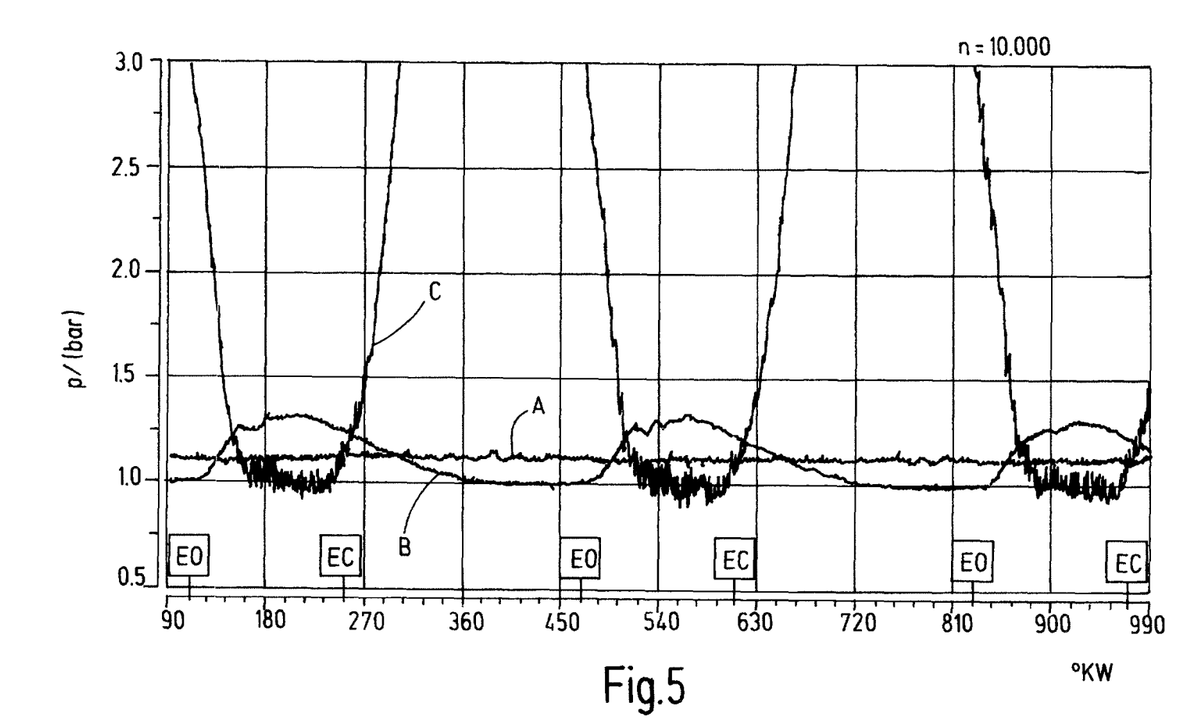

The FIGS. 4 and 5 show the pressure curve p for different rotational speeds in bar over the crank angle of the crankshaft 122 in degrees, and FIG. 4 shows the pressure curves A, B and C for a two-stroke engine 110 with a rotational speed n=700 rpm and FIG. 5 shows the pressure curves for a rotational speed n=10,000 rpm. The crank angle, at which the outlet of the combustion space 130 opens and closes, is indicated for a plurality of gas changes. Here, the indication EO indicates that the outlet of the combustion space 113 is opened and the indication EC indicates that the outlet of the combustion space 113 is being closed again. FIG. 4 shows two opening cycles of the outlet and the pressure curve in the combustion space 113 is indicated with CC. Because of the higher rotational speed, FIG. 5 shows three opening cycles of the combustion space 113, indicated by the pressure curves C.

The pressure curve A shows the curve of the pressure of the exhaust gas mass flow at the outlet for a muffler 200 with the features of the present invention, and B shows the pressure curve of the exhaust gas mass flow at the outlet of a conventional muffler which has a ratio of the volumes of a pre-chamber to the total volume of a muffler which is not in the claimed range.

Both in FIG. 4 at a rotational speed of n=7,000 rpm as well as in FIG. 5 at a rotational speed n=10,000 rpm it is evident that the pressure curve A of the exhaust gas mass flow at the outlet of a muffler 200 with the volume ratio according to the invention has a lower pressure fluctuation than the pressure curve B. With a view to FIG. 5 it is evident that the pressure curve A at a rotational speed n=10,000 rpm the pressure curve A runs very evenly at approximately 1.125 bar so that the exhaust gas leaving the muffler 200 merely has a small or no pressure fluctuation. Because of this it is achieved that the muffler 200 very greatly muffles the operating noise of the two-stroke engine 110.

In its embodiment, the invention is not restricted to the preferred exemplary embodiment stated above. A number of variants is rather conceivable which makes use of the presented solution even with embodiments of a fundamentally different type. All features and/or advantages arising from the claims, the description or the drawings including design details or spatial arrangements can be substantial to the invention both by themselves as well as in any combinations.

LIST OF REFERENCE CHARACTERS 100, 200 Two-stroke engine
10 Muffler
11 Muffler inlet
12 Flow channel
13 Combustion space
14 Channel end
15 First chamber
16 Second chamber
17 Main outlet
18 Cylinder
19 Outlet
20 Auxiliary outlet
21 Piston
22 Crankshaft
23 Connecting rod
24 Crankcase
25 Overflow channel
26 Overflow window
A Pressure curve in the combustion space
B Pressure curve in the first chamber
X Intermediate maximum pressure
p Pressure in bar
° KW Crank angle in degrees
EO Outlet of the combustion space opened
EC Outlet of the combustion space closed
TPO Overflow channel in the combustion space opened
TPC Overflow channel in the combustion space closed
BDC Bottom dead centre
110 Two-stroke engine
111 Muffler inlet
112 Flow channel
113 Combustion space
114 Channel end
115 First chamber
116 Second chamber
117 Main outlet
118 Cylinder
119 Outlet
120 Auxiliary outlet
121 Piston 122 Crankshaft
123 Connecting rod
124 Crankcase
A Pressure curve of the exhaust gas mass flow at the outlet
B Pressure curve of the exhaust gas mass flow at the outlet of a conventional muffler
C Pressure curve in the combustion space
n Rotational speed of the two-stroke engine
b Pressure in bar
° KW Crank angle in degrees
EO Outlet of the combustion space opened
EC Outlet of the combustion space closed

The invention claimed is:

1. A two-stroke engine of an engine-operated tool having a muffler, wherein
the muffler comprises a muffler inlet, which is followed by a flow channel, so that
the flow channel is connected to an outlet of a combustion space of the two-stroke engine by the muffler inlet,
and wherein at least one overflow channel opens into the combustion space, via which fuel-air mixture enters the combustion space when a piston moveably limiting the combustion space is in a region of bottom dead centre,
wherein the flow channel opens into a first chamber on a channel end located opposite the muffler inlet,
and a second chamber into which exhaust gas flows through a main outlet branched off the flow channel and out of which the exhaust gas flows through a muffler outlet is provided,
the flow channel between the muffler inlet and the first chamber is molded such that the exhaust gas flowing into the muffler inlet because of a mass inertia of the exhaust gas predominantly flows into the first chamber and following a charging of the first chamber flows back again, thereby resulting in a counterpressure being formed in or in the direction of the combustion space,
the formation of the counterpressure of the exhaust gas occurring in a time range in which the outlet of the combustion space is exposed by the piston and the fuel-air mixture at least predominantly reaches the combustion space through the at least one overflow channel that is open during the time range in which the outlet of the combustion space is exposed by the piston.

2. The two-stroke engine according to claim 1, wherein the geometrical design of the at least one overflow channel is of such that the formation of the counterpressure of the exhaust gas occurs in a time range in which the overflow channel to the combustion space is exposed by the piston.

3. The two-stroke engine according to claim 1, wherein at least the flow channel and the first chamber are designed such that the formation of the counterpressure of the exhaust gas occurs in a time range in which the overflow channel to the combustion space is exposed by the piston.

4. The two-stroke engine according to claim 1, wherein the counterpressure of the exhaust gas at the time and/or an amount of the exhaust gas is determined such that the quantity of the fuel-air mixture entering the combustion space through the overflow channel can be reduced.

5. The two-stroke engine according to claim 1, wherein the at least one overflow channel is arranged in a position on the cylinder located opposite the outlet of the combustion space.

6. The two-stroke engine according to claim 1, wherein the outlet of the combustion space opens at approximately 110° crank angle, wherein the flow channel and/or the first chamber are designed such that in the first chamber a maximum pressure materializes at 140° to 160° crank angle.

7. The two-stroke engine according to claim 1, wherein through the counterpressure of the exhaust gas an intermediate maximum pressure forms in the combustion space when the piston is in bottom dead centre.

8. An operating method for operating a two-stroke engine of an engine-driven tool with a muffler, wherein
the muffler comprises a muffler inlet which is followed by a flow channel, so that
the flow channel is attached to an outlet of a combustion space of the two-stroke engine by the muffler inlet,
and wherein at least one overflow channel opens into the combustion space, via which fuel-air mixture enters the combustion space when a piston moveably limiting the combustion space is in a region of bottom dead centre,
wherein the flow channel opens into a first chamber on a channel end located opposite the muffler inlet,
and a second chamber into which exhaust gas flows through a main outlet branched off the flow channel and out of which the exhaust gas flows through a muffler outlet is provided,
the flow channel between the muffler inlet and the first chamber is molded such that the exhaust gas flowing into the muffler inlet because of a mass inertia of the exhaust gas predominantly flows into the first chamber and following a charging of the first chamber flows back again, thereby resulting in a counterpressure being formed in or in the direction of the combustion space,
further comprising over the stroke movement of the piston:
opening of the outlet of the combustion space through a downward movement of the piston,
opening of the overflow channel through further downward movement of the piston,
forming of the counterpressure of the exhaust gas in the direction of the combustion space while the outlet of the combustion space and the at least one overflow channel are open,
closing of the overflow channel through an upward movement of the piston and
closing of the outlet of the combustion space through further upward movement of the piston.

9. The operating method according to claim 8, wherein the counterpressure of the exhaust gas is formed in a time range in which the piston passes through the bottom dead centre, and wherein through the counterpressure of the exhaust gas an intermediate maximum pressure is formed in the combustion space, when the piston is in the bottom dead centre.

10. The operating method according to claim 8, wherein through the counterpressure of the exhaust gas the outflow behavior of the fuel-air mixture out of the overflow channel into the combustion space is influenced, and wherein the quantity of the fuel-air mixture entering the combustion space out of the overflow channel is reduced through the counterpressure of the exhaust gas.

11. A muffler for a two-stroke engine of an engine-driven tool according to claim 1, wherein
the muffler comprises a muffler inlet, which is followed by a flow channel, so that
the flow channel is connected to an outlet of a combustion space of the two-stroke engine by the muffler inlet,
wherein the flow channel opens into a first chamber at a channel end located opposite the muffler inlet,
wherein a second chamber is provided
into which the exhaust gas flows through a main outlet branched off the flow channel and out of which the exhaust gas flows through a muffler outlet, wherein the flow channel between the muffler inlet and the first chamber is molded such that the exhaust gas flowing into the muffler inlet because of a mass inertia of the exhaust gas predominantly flows into the first chamber and following a charging of the first chamber flows back again, thereby resulting in a counterpressure being formed in the direction of the combustion space, and the ratio of the volume of the first chamber to the total volume of the muffler is 1/40 to 1/2.

12. The muffler according to claim 1, wherein the ratio of the volume of the first chamber to the total volume of the muffler is 1/20 to 1/8.

13. The muffler according to claim 1, wherein the ratio of the volume of the first chamber to the total volume of the muffler is 1/16 to 1/10.

14. The muffler according to claim 1, wherein the total volume of the muffler is formed out of the volumes of the first chamber, the second chamber and the flow channel.

15. The muffler according to claim 1, wherein the ratio of the volume of the flow channel to the total volume of the muffler is 1/50 to 1/10.

16. The muffler according to claim 1, wherein the two-stroke engine has a stroke volume, and wherein the ratio of the volume of the first chamber to the stroke volume is 1/4 to 2.

17. The muffler according to claim 1, wherein the first chamber is enclosed by the second chamber or the first chamber is arranged outside the second chamber.

18. The muffler according to claim 1, wherein the ratio of the volume of the second chamber to the stroke volume is 3 to 10.

19. The muffler according to claim 1, further comprising the muffler being formed of stainless steel and having a wall thickness of 0.5 mm to 1.2 mm.

20. The muffler according to claim 13, wherein the ratio of the volume of the first chamber to the total volume of the muffler is 1/12.

* * * * *